March 31, 1959  R. D. TOLLEFSON  2,880,400
VARIABLE INDUCTOR
Filed July 1, 1953
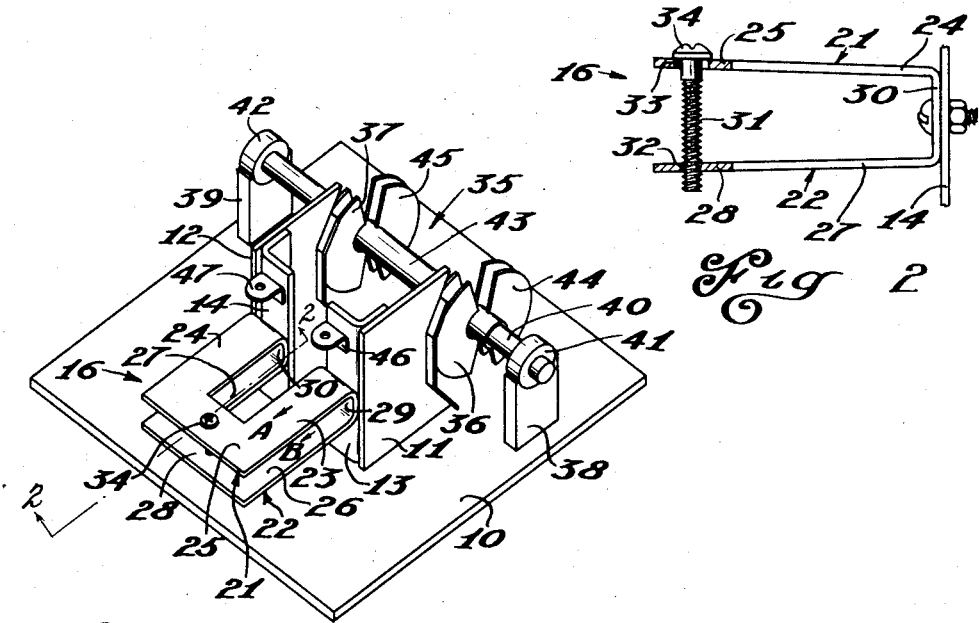
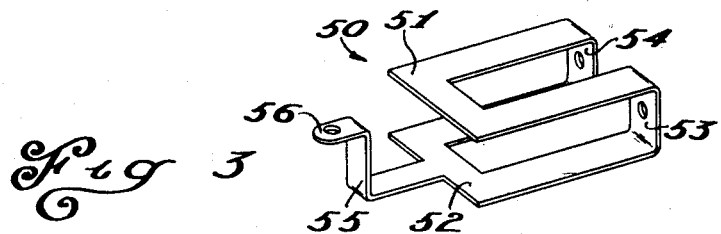
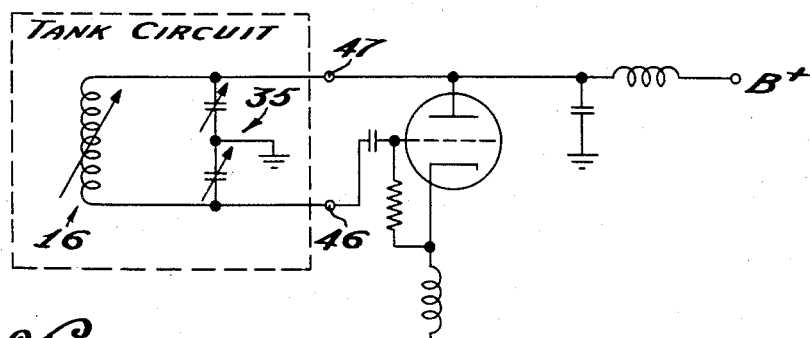
INVENTOR.
ROBERT D. TOLLEFSON
BY
ATTORNEY

United States Patent Office 2,880,400
Patented Mar. 31, 1959

2,880,400

VARIABLE INDUCTOR

Robert D. Tollefson, Cedar Rapids, Iowa, assignor to Collins Radio Company, Cedar Rapids, Iowa, a corporation of Iowa Application July 1, 1953, Serial No. 365,414

5 Claims. (Cl. 336—20)

This invention relates generally to variable inductors and particularly to trimmer inductors used in very high frequency systems.

At higher frequencies the size of inductances decreases if the reactance is maintained constant. Inductances which comprise many turns of wire on a coil form are generally too large for use in the very high frequency range. It is necessary to provide very small structures which are capable of accurate adjustment to a critical value. It is therefore the principal object of this invention to provide a small inductance which can be very accurately adjusted.

It is another object of this invention to provide an accurate inductor which may be produced economically.

A feature of this invention is found in the provision for a pair of generally U-shaped metallic plates which are fastened together at their ends and mounted parallel to each other.

Further objects, advantages and features of this invention will become apparent to one skilled in the art upon further study of the specification and drawings, in which:

Figure 1 is a perspective view of one embodiment of this invention when used in a tank circuit;

Figure 2 is an enlarged sectional view of this invention along line 2—2 of Figure 1;

Figure 3 is a perspective view of another embodiment of this invention; and,

Figure 4 is a schematic diagram showing how this invention may be connected in an oscillator.

Figure 1 shows a tank circuit which contains this invention. A base plate 10 of insulating material is provided which supports a pair of metallic uprights 11 and 12. A metallic bracket 13 is fastened to upright 11, and another metallic bracket 14 is fastened to upright 12.

An inductor 16 comprises a pair of U-shaped members 21 and 22. Member 21 has legs 23 and 24 that are connected together by a central portion 25. Likewise, member 22 has legs 26 and 27 and a central portion 28.

Coupling members 29 and 30 are attached to brackets 13 and 14, respectively. Coupling member 29 joins legs 23 and 26, and member 30 joins legs 24 and 27.

A screw 31 is threadedly received in a hole 32 formed in central portion 28 and extends loosely through an opening 33 formed in central portion 25. The head 34 of the screw engages the portion 25. The members 21 and 22 tend to separate and the screw 31 holds them a predetermined distance apart.

A condenser 35 provides a variable capacitance and has a first pair of stator plates 36 which are fastened to upright 11 and a second pair of stator plates 37 which are fastened to upright 12. A pair of supports 38 and 39 are mounted on plate 10 and rotatably support a shaft 40 of insulating material by means of bearings 41 and 42. A metallic sleeve 43 is fixed on shaft 40 and supports a first pair of rotor plates 44 adjacent stator plates 36 and a second pair of rotor plates 45 adjacent stator plates 37.

Output terminals are provided for the tank circuit in Figure 1 by means of lugs 46 and 47 fastened respectively to brackets 13 and 14.

Figure 3 shows another embodiment of this invention generally designated as inductor 50. Like the embodiment of Figure 1, it may be formed from a single piece of sheet metal into a U-shaped upper portion 51 and a U-shaped lower portion 52 which are connected by couplings 53 and 54. A lip 55 extends from the center of lower portion 52 and a hole 56 is formed in lip 55 for a center tap connection. Inductor 16 in Figure 1 could be replaced by inductor 50 by fastening respectively coupling members 53 and 54 to brackets 13 and 14.

The tank circuit shown in Figure 1 may be used in any suitable manner. Very often it is necessary to operate an oscillator or a tuner within a designated frequency range, for example, within the limits of 220 megacycles to 340 megacycles. This invention provides an inductance which may be trimmed so that the range of the tuner is precisely as required.

In operation, a loop of radio frequency current will enter inductor 16 at coupling member 29, travel around the rectangular circuit of upper and lower portions 21 and 22, and leave at coupling member 30.

Portions 21 and 22 in Figure 1 present substantially equal impedances because of their geometrical symmetry. Therefore, current entering at coupling member 29 will divide between portions 21 and 22 into substantially equal parts A and B. Currents A and B will recombine at coupling member 30. There will be no current flow through screw 31 because it contacts portions 21 and 22 at points of equal potential.

Control of inductance in this invention may be explained as follows: Inductance is defined as flux linkages per unit of current. Currents A and B will produce substantially equal amounts of flux about portions 21 and 22. Part of the flux caused by current A will link current B, and similarly part of the flux caused by current B will link current A. The total amount of flux linkage is therefore dependent upon the spacing between upper portion 21 and lower portion 22. Adjustment of screw 31 then controls the inductance of inductor 16 since it controls the spacing of the currents in portions 21 and 22.

The operation of inductor 50 is similar to the operation of inductor 16. The spacing of upper and lower portions 51 and 52, and therefore the inductance of inductor 50, is controlled by bending portions 51 and 52 to the proper spacing with lip 55. It has been found that its inductance can be very accurately adjusted in this manner. Inductor 50 is suitable for those applications that require an inductor with a center tap.

It is, of course, understood that screw 31 may be left out of inductor 16 and its spacing adjusted by bending the upper and lower portions as is done with inductor 50.

It is therefore seen that this invention provides a very simple and economical inductor which can be very accurately controlled.

While particular embodiments of this invention have been described in this specification, it is to be understood that they are capable of various changes and modifications by a person skilled in the art without departing from the spirit and scope of the invention as defined in the appended claims.

I claim:

1. A variable inductor comprising first and second normally spaced U-shaped conductive portions, first and second coupling members connecting together the opposed legs of said U-shaped portions, a first terminal connected to one of said coupling members and a second terminal connected to the other of said coupling members whereby said U-shaped portions constitute parallel conductive paths, and means connected to at least one of said portions for varying the spacing therebetween.

2. An inductor comprising, a U-shaped upper portion, a U-shaped lower portion, a pair of coupling members joining the legs of said upper and lower portions to hold them in space-separated juxtaposition, a first terminal connected to one of said coupling members, a second terminal connected to the other of said coupling members, said U-shaped portions having geometrical symmetry such that they present substantially equal impedances across said first and second terminals and a screw centrally mounted between equal impedance points on upper and lower portions to adjust their spacing.

3. A variable inductor comprising, a generally U-shaped upper portion, a like generally U-shaped lower portion, a first coupling member joining the first ends of said upper and lower portions, and a second coupling member joining the other ends of said upper and lower portions, a first terminal connected to one of said coupling members, a second terminal connected to the other of said coupling members, said first and second coupling members holding said U-shaped portions in said substantially paralleled juxtaposition whereby said portions present substantially equal impedances across said first and second terminals, one of said portions being displaceable to vary the spacing therebetween.

4. A variable inductor comprising, a generally U-shaped upper portion, a geometrically similar generally U-shaped lower portion, a first coupling member joining the first ends of said upper and lower portions, a second coupling member joining the other ends of said upper and lower portions said coupling members holding said upper and lower portions in substantially paralleled juxtaposition, a first terminal connected to one of said coupling members, a second terminal connected to the other of said coupling members, and a screw centrally located between opposed points on said upper and lower portions to adjust their spacing and inductance.

5. A variable inductor comprising, a generally U-shaped upper portion, a geometrically similar generally U-shaped lower portion, a first coupling member joining the first ends of said upper and lower portions, a second coupling member joining the other ends of said upper and lower portions, said coupling members holding said U-shaped portions in space-separated juxtaposition, a first terminal connected to one of said coupling members, a second terminal connected to the other of said coupling members, and a lip extending from the center of said lower portion to form a center tap for said inductor, said lower portion being displaceable by said lip to vary the spacing therebetween.

References Cited in the file of this patent

UNITED STATES PATENTS

| | | |
|---|---|---|
| 1,619,597 | Clark | Mar. 1, 1927 |
| 2,410,222 | Lawrence | Feb. 17, 1944 |
| 2,475,637 | Vladimir | July 12, 1949 |
| 2,497,854 | Baller | Feb. 21, 1950 |
| 2,521,963 | Buesman | Sept. 12, 1950 |
| 2,655,590 | Gardner | Oct. 13, 1953 |

FOREIGN PATENTS

| | | |
|---|---|---|
| 604,652 | Great Britain | July 7, 1948 |
| 658,637 | Great Britain | Oct. 10, 1951 |
| 747,762 | France | Apr. 4, 1933 |